(12) United States Patent
Wanner et al.

(10) Patent No.: US 10,773,751 B2
(45) Date of Patent: Sep. 15, 2020

(54) METHOD FOR OPERATING A STEERING SYSTEM

(71) Applicant: Robert Bosch Automotive Steering GmbH, Schwäbisch Gmünd (DE)

(72) Inventors: Thomas Wanner, Schorndorf (DE); Eman Mehrjerdian, Bonn (DE)

(73) Assignee: Robert Bosch Automotive Steering GmbH, Schwäbisch Gmünd (DE)

( * ) Notice: Subject to any disclaimer, the term of this patent is extended or adjusted under 35 U.S.C. 154(b) by 406 days.

(21) Appl. No.: 15/313,134

(22) PCT Filed: Apr. 2, 2015

(86) PCT No.: PCT/EP2015/057323
§ 371 (c)(1),
(2) Date: Nov. 22, 2016

(87) PCT Pub. No.: WO2015/176863
PCT Pub. Date: Nov. 26, 2015

(65) Prior Publication Data
US 2017/0137060 A1    May 18, 2017

(30) Foreign Application Priority Data

May 22, 2014    (DE) ........................ 10 2014 107 194

(51) Int. Cl.
*B62D 15/02*          (2006.01)
*B62D 6/00*           (2006.01)
(Continued)

(52) U.S. Cl.
CPC ........... *B62D 15/025* (2013.01); *B62D 1/166* (2013.01); *B62D 1/286* (2013.01); *B62D 5/008* (2013.01); *B62D 6/002* (2013.01); *B62D 6/08* (2013.01)

(58) Field of Classification Search
CPC ........ B62D 15/025; B62D 6/002; B62D 6/08; B62D 5/008; B62D 1/166; B62D 1/286
See application file for complete search history.

(56) References Cited

U.S. PATENT DOCUMENTS 9,221,466 B2    12/2015   Lich et al.
9,342,074 B2 *  5/2016    Dolgov ................. B60W 30/00
(Continued)

FOREIGN PATENT DOCUMENTS

DE    102007029909 A1    1/2009
DE    102010003099       9/2011
(Continued)

OTHER PUBLICATIONS

International Search Report for Application No. PCT/EP2015/057323 dated Mar. 7, 2016 (English Translation, 3 pages).

*Primary Examiner* — Michael V Kerrigan
(74) *Attorney, Agent, or Firm* — Michael Best & Friedrich LLP

(57) ABSTRACT

A method is described for operating a steering system (2) of a motor vehicle. A steering means (8) is connected to a steering gear (14) by means of an active steering system (4). During autonomous operation of the motor vehicle, a driver's intervention (40) in the steering means (8) is determined. The active steering system (4) is operated in such a way that a coupling (30) between an angle (26) of the steering means and an angle (28) input into the steering gear (14) is adjusted depending on the thus determined driver's intervention (40).

17 Claims, 3 Drawing Sheets

(51) Int. Cl.
*B62D 5/00* (2006.01)
*B62D 1/16* (2006.01)
*B62D 1/28* (2006.01)
*B62D 6/08* (2006.01)

(56) References Cited

U.S. PATENT DOCUMENTS

| | | |
|---|---|---|
| 9,409,600 B2 | 8/2016 | Muller |
| 9,771,101 B2 * | 9/2017 | Mitsumoto ............ B62D 1/286 |
| 2012/0203431 A1 | 8/2012 | Kojo et al. |
| 2013/0190988 A1 | 7/2013 | Limpibuntering et al. |

FOREIGN PATENT DOCUMENTS

| | | |
|---|---|---|
| DE | 102012022387 B3 | 2/2014 |
| EP | 2138380 | 12/2009 |
| EP | 2495156 | 9/2012 |
| WO | 2011042791 | 4/2011 |

* cited by examiner

METHOD FOR OPERATING A STEERING SYSTEM

BACKGROUND OF THE INVENTION

The invention relates to a method for operating a steering system of a motor vehicle.

It is known that the use of driver assistance systems and driving functions which permit the highly autonomous or fully autonomous driving of a motor vehicle always also have to provide the possibility of transferring the control over the vehicle to the driver of the vehicle. If the driver of the vehicle has control over the vehicle, possibilities must be made available for changing back into the autonomous driving mode.

Furthermore, steering systems are known which have both a superimposition steering system and a power steering system. The superimposition steering system is also referred to as active steering (AFS=Active Front Steering) and brings about an angle superimposition. The power steering system is also referred to as servo steering and can be a hydraulic steering system or an electromechanical steering system (EPS=Electric Power Steering). The power steering system brings about a torque superimposition in a driving mode in which the driver is assisted in his driving request or steering request.

Functions and sensors are also known which detect a driver intervention into a steering means.

SUMMARY OF THE INVENTION

The problem on which the invention is based is solved by a method. Important features for the invention can also be found in the following description and in the drawings, wherein the features can be important for the invention either alone or in different combinations, without reference being explicitly made thereto once more.

By virtue of the fact that a superimposition steering system is operated in such a way that a coupling between a steering means angle and an angle which is introduced into a steering gear is adjusted as a function of a driver intervention detected during an autonomous driving mode of the motor vehicle it is advantageously ensured that the driver alone can himself determine, through the active operation of the steering means, for example in the form of a steering wheel, how much control he would like to have over the steering system and therefore over the motor vehicle. In the case of an autonomous driving mode with an active autonomous steering function, a harmonious transfer between the driver and the steering function can therefore be made possible.

In one advantageous refinement of the method, the influence of an autonomous steering function on the wheel steering angle is determined as a function of the detected driver intervention. This permits the autonomous steering function to be used selectively to implement the harmonious transfer between the driver and the autonomous steering function.

In one advantageous embodiment, the coupling is increased as a function of an increasing or essentially consistently elevated driver intervention. The driver of the vehicle is therefore advantageously provided with more control over the steering system and therefore more control over the wheel steering angle.

In one advantageous development, the influence of the steering function on the wheel steering angle is reduced as a function of an increasing or essentially constant increased driver intervention. This measure increases further the control of the driver of the vehicle over the wheel steering angle of the steering system.

In one advantageous development of the method, at a first time the increasing or essentially constant increased driver intervention is detected. Starting from the first time, the coupling is increased up to a second time and/or the influence of the autonomous steering function on the wheel steering angle is reduced in such a way that at or after the second time the autonomous steering function can be deactivated or is deactivated. This provides a method with which the driver of the motor vehicle can be forced, within a determined time period, to assume the control over the vehicle. For example in a situation in which the autonomous steering function is faulty or another sub-system has a fault, the control over the vehicle must be transferred to the driver of the vehicle.

In one advantageous embodiment, the coupling is reduced as a function of a reducing driver intervention. Therefore, the autonomous steering function can assume the control over the vehicle, for example, as soon as the driver takes his hands off the steering means or the steering wheel or else the driver would like to give up the control over the vehicle by means of a separate signaling means.

In one advantageous embodiment, the influence of the autonomous steering function on the wheel steering angle is increased as a function of a reducing driver intervention.

In one advantageous embodiment, at a third time the reducing driver intervention is detected. Starting from the third time up to a fourth time the coupling is then reduced and/or the influence of the autonomous steering function on the wheel steering angle is increased in such a way that at or after the third time the steering function has complete control over the steering system. Therefore, time periods can be defined which permit, for example, a harmonious transfer of the control to the autonomous steering function in the case of a reducing driver intervention, for example as a function of the vehicle speed or other variables.

In one advantageous embodiment, the coupling is adjusted as a function of a current and/or planned setpoint torque input into the steering gear, which input is detected by the autonomous steering function. For example in the case of highly transient changes in torque, for example when traveling through a roundabout, it is therefore advantageously possible for the coupling to remain reduced, as a function of the planned high setpoint torque input, to such an extent that a risk of injury by a rotating steering wheel to which a torque is applied by the servo steering is reduced. On the other hand, the coupling can be adjusted to such a high setting that even in the case of travel through a roundabout with a corresponding input of torque into the steering gear an avoidance maneuver is still possible by the driver.

In one advantageous embodiment, in the case of an increased vehicle speed the time period between the first time and the second time and/or the time period between the third time and the fourth time is selected to be longer than in the case of a reduced vehicle speed. This makes it possible to ensure that the control over the steering system is transferred between the driver and the autonomous driving function in accordance with the driving situation.

In a further advantageous embodiment a differentiation is made between an intended driver intervention and an unintended driver intervention. In the case of an intended driver intervention the coupling is increased or maintained. In the case of an unintended driver intervention the coupling is reduced. It is therefore possible, for example, on the one hand to reduce the risk of injury by an input of torque into the steering means by a power steering system. On the other hand, advantages are obtained in respect of the transfer to or from the autonomous steering function.

BRIEF DESCRIPTION OF THE DRAWINGS

Further features, application possibilities and advantages of the invention can be found in the following description of exemplary embodiments of the invention which are illustrated in the figures of the drawing. In this context, all the features which are described or illustrated form, per se or in any desired combination, the subject matter of the invention independently of their combination in the patent claims or their back-reference and independently of their formulation or presentation in the description or in the drawing. In some cases the same reference symbols are also used for different embodiments, without a restriction arising directly from this. The exemplary embodiments of the invention are explained below with reference to the drawing. In the drawing:

DETAILED DESCRIPTION

Figure 1:
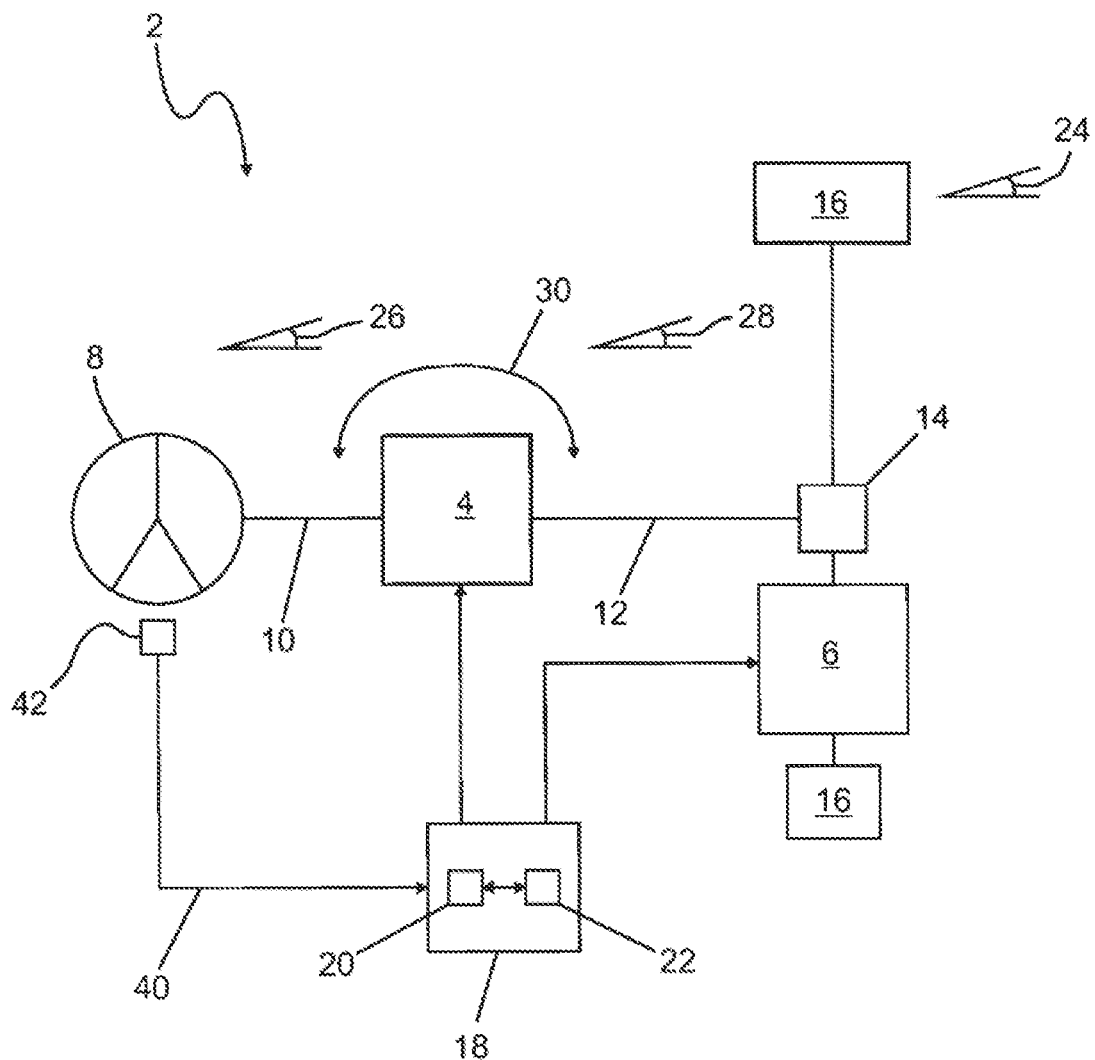
FIG. 1 shows a schematically illustrated steering system.

FIG. 1 shows a steering system 2 in schematic form. The steering system 2 comprises a superimposition steering system 4 and a power steering system 6. A steering means 8, for example a steering wheel, is connected to the superimposition steering system 4 via an input shaft 10 of the superimposition steering system 4. The superimposition steering system 4 is connected to a steering gear 14 via an output shaft 12 of the superimposition steering system 4. The steering gear 14 can be embodied, for example, as a rack and pinion steering gear, as a recirculating ball gear or as a ball and nut gear. In the form of a rack and pinion steering gear the steering gear 14 comprises, for example, a rack and a pinion. The steering gear 14 is connected via the pinion and the rack to a corresponding steering linkage on each side of the vehicle, which steering linkage interacts with a wheel 16 in each case. Other embodiments of the devices suitable for carrying out the method according to the invention are conceivable. These embodiments can be configured, for example, by means of other steering gears or by means of another arrangement of the superimposition steering system 4 and the power steering system 6.

Furthermore, a control device 18 is shown with which the superimposition steering system 4 and the power steering system 6 can be open-loop and/or closed-loop controlled. The control device 18 has a digital computing device 20 in the form of a microprocessor and a memory 22. A computer program which is designed to carry out one of the methods described here can be stored in the memory 22. Correspondingly, this computer program can be executed on the digital computing device 20. Of course, instead of the control device 18 it is also possible for a plurality of control devices which are networked to one another to be provided.

In a non-autonomous driving state, a wheel steering angle 24 occurs at the wheels 16 of the vehicle as a function of the state of the steering means 8. Depending on the position of the steering means 8 and/or of the input shaft 10 a steering means angle 26 occurs. An angle 28 which is introduced into the steering gear 14 results at the output shaft 12 essentially by means of a transmission ratio into the wheel steering angle 24. Consequently, the wheel steering angle 24 and the angle 28 can be used here in an exchangeable fashion with one another.

A coupling 30 between the steering means angle 26 and the angle 28 which is introduced into the steering gear 14 can be adjusted with the superimposition steering system 4. Increasing the coupling 30 means reducing a relative movement of the input shaft 10 with respect to the output shaft 12. Reducing the coupling 30 means, on the other hand, increasing the relative movement of the input shaft 10 with respect to the output shaft 12. By adjusting the coupling 30 it is therefore possible, for example in the case of a fully autonomous driving mode, to adjust the wheel steering angle 24 by means of the power steering system 6, wherein the steering means 8 does not move. Of course, complete tracking of the steering means 8, that is to say essentially synchronous running of the shafts 10 and 12, can also be made possible in the autonomous driving mode, wherein, however, the coupling 30 is immediately reduced in the event of an intervention by the driver into the steering means 8, but it can be increased again in the event of continuous intervention by the driver into the steering means 8.

A driver intervention 40 can be detected, for example, by means of a sensor 42 on the steering means 8. In another embodiment, the driver intervention 40 can also be detected within the control device 18 from other measurement variables and/or from detected variables which are present in the control device 18. Consequently, the sensor is to be understood as merely an example for the detection of the driver intervention 40.

In the fully autonomous driving mode or driving state of the vehicle, the wheel steering angle 24 is influenced as a function of a steering torque introduced via the power steering system 6, as a function of an autonomous steering function, running on the control device 18, without a driver intervention 40. Therefore, a fully autonomous driving state of the motor vehicle is to be understood as meaning a driving state of the motor vehicle in which the driver does not engage in the steering means 8 in order to obtain control over the vehicle but instead the entire control over the vehicle or over the steering system 2 is exercised by the autonomous driving function. In contrast, a partially autonomous driving state of the motor vehicle or of the steering system is to be understood as meaning a state in which a driver intervention 40 is occurring and in which the control over the vehicle is transferred either from the driver to the autonomous steering function or from the autonomous steering function to the driver. Therefore, if the driver intervention 40 is detected for the first time in the fully autonomous driving state, the vehicle goes into the partially autonomous driving state in which the driver intervention 40 has an effect on the wheel steering angle 24 via the correspondingly adjusted coupling 30.

Figure 2:
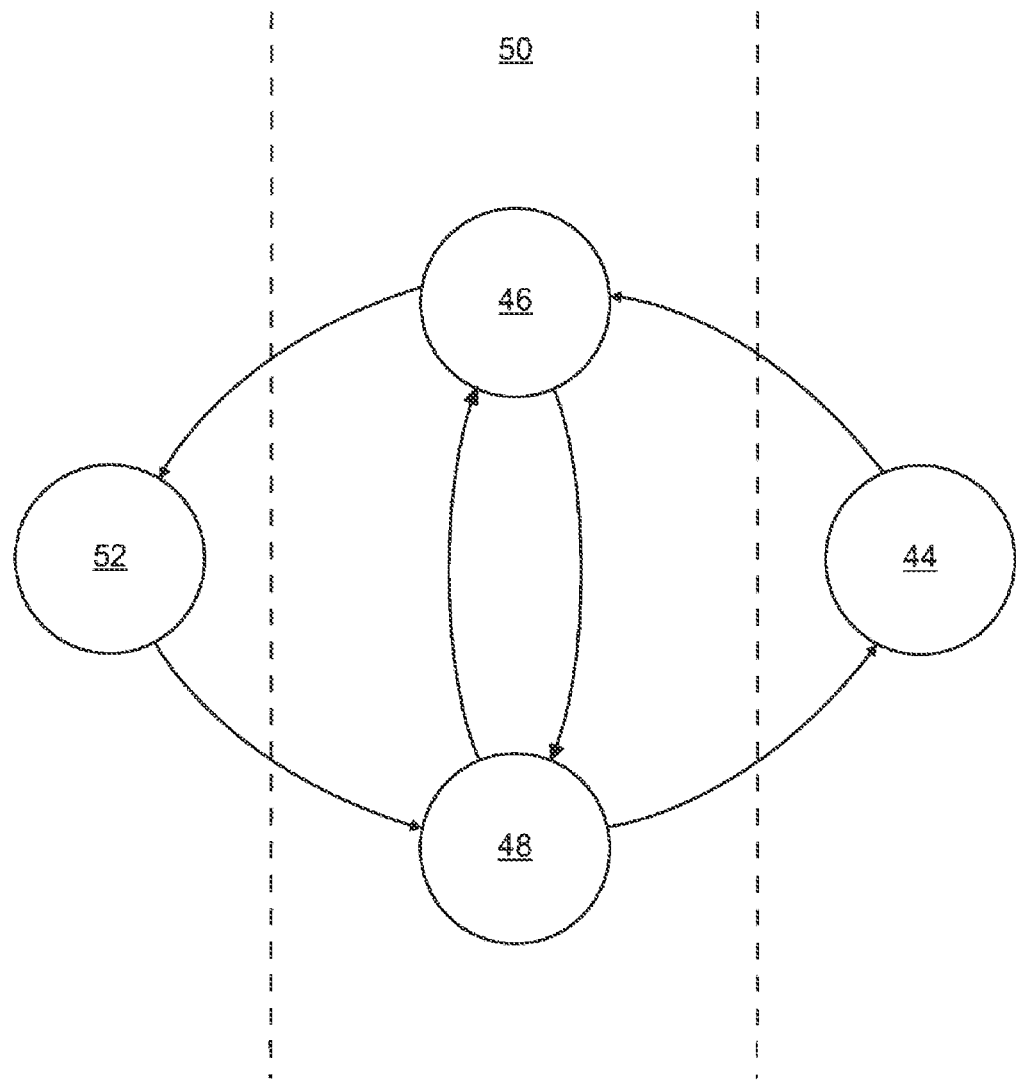
FIG. 2 shows a state transition diagram.

FIG. 2 shows a schematic state transition diagram with the fully autonomous driving state 44, a first partially autonomous driving state 46 and a second partially autonomous driving state 48 in the region 50. Starting from the partially autonomous driving state 46 it is possible to change into a non-autonomous driving state 52 in which an autonomous driving function does not actively or does not have any influence on the wheel steering angle 24. Consequently, the partially autonomous driving states 46 and 48 can each be denoted also as transient states, wherein by means of the transient state 46 it is possible to change from a fully autonomous driving state to the non-autonomous driving state 52. By means of the transient state 48 it is possible to change from the non-autonomous driving state 52 into the fully autonomous driving state 44. In the transient state 46 there is provision to increase the coupling 30 in response to a driver intervention 40 in order therefore to give the driver more control over the vehicle. In the transient state 48 there is provision to give the driver less control and the autonomous steering function more control in response to a reduced driver intervention 40. It is possible to change back and forth between the transient states 46 and 48 depending on the detected increasing or reducing driver intervention 40.

Figure 3:
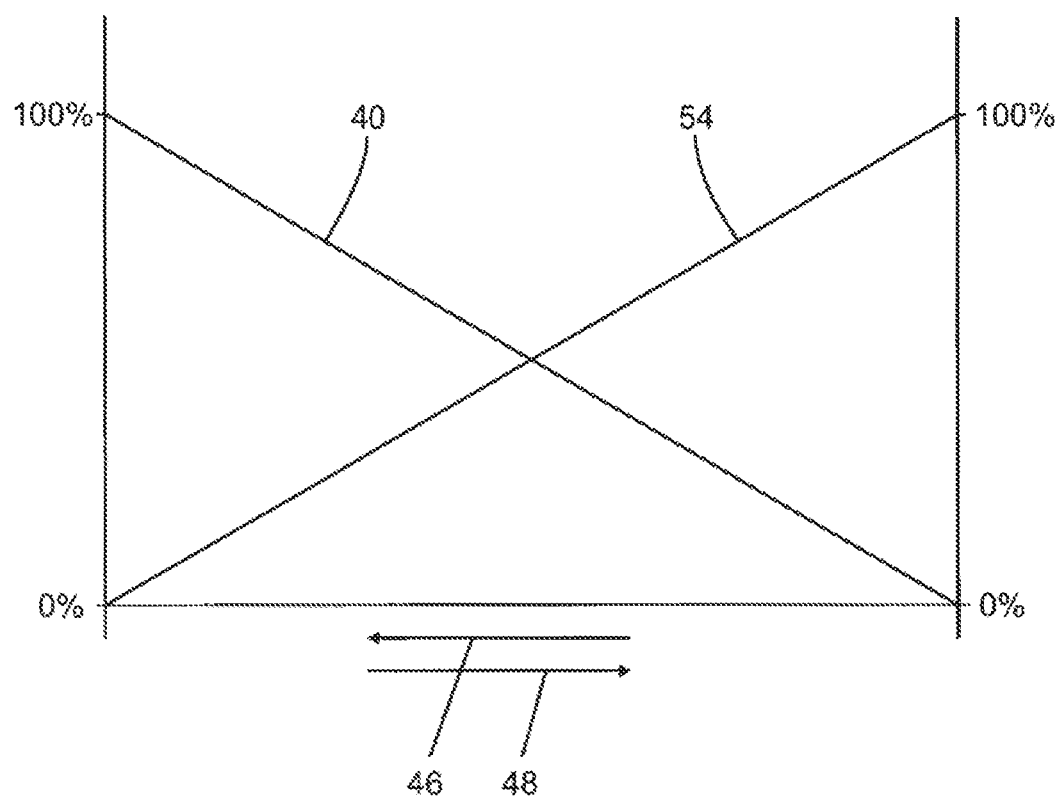
FIG. 3 shows a schematic relationship between an influence of the autonomous driving function on a wheel steering angle and a driver intervention.

FIG. 3 illustrates in schematic form the relationship between the driver intervention 40 and the influence 54 of the autonomous driving function on the wheel steering angle. In the transient state 46, for example, the influence 54 of the autonomous driving function is reduced, whereas at the same time the driver intervention 40 is increased. In contrast, in the transient state 48 the influence 54 of the autonomous driving function is increased and the driver intervention 40 is reduced.

The invention claimed is:

1. A method for operating a steering system (2) of a motor vehicle, wherein a steering means (8) is connected by an input shaft to a superimposition steering system (4) and the superimposition steering system (4) is connected by an output shaft to a steering gear (14) for vehicle wheels, the steering system (2) including a power steering system (6) for turning the vehicle wheels and a control device (18) for controlling the superimposition steering system (4) and the power steering system (6), the method comprising:
 detecting, during an autonomous driving mode of the motor vehicle, a driver intervention (40) of the driver into the steering means, and
 operating the superimposition steering system (4) in such a way that a coupling (30) between a steering means angle (26) and an angle (28) which is introduced into the steering gear (14) is adjusted as a function of the detected driver intervention (40).

2. The method as claimed in claim 1, wherein an autonomous steering function by means of which a wheel steering angle (24) of the steering system (2) of the motor vehicle can be influenced is active during the autonomous driving mode, and further comprising determining the influence of the autonomous steering function on the wheel steering angle (24) as a function of the detected driver intervention (40).

3. The method as claimed in claim 2, further comprising reducing the influence of the autonomous steering function on the wheel steering angle (24) as a function of an increasing or constantly increased driver intervention (40).

4. The method as claimed in claim 2, wherein the influence of the autonomous steering function on the wheel steering angle (24) is increased as a function of a reducing driver intervention (40).

5. The method as claimed in claim 2, wherein the coupling (30) is adjusted as a function of a current and/or planned setpoint torque input into the steering gear (14), which input is detected by the autonomous steering function.

6. The method as claimed in claim 1, further comprising increasing the coupling (30) by reducing a relative movement of the input shaft with respect to the output shaft as a function of an increasing or consistently elevated driver intervention (40).

7. The method as claimed in claim 6, further comprising detecting the increasing or constant increased driver intervention (40) at a first time, and wherein starting from the first time up to a second time the coupling (30) by reducing the relative movement of the input shaft with respect to the output shaft is increased and/or the influence of the autonomous steering function on the steering wheel angle (24) is reduced in such a way that at or after the second time the autonomous steering function can be deactivated.

8. The method as claimed in claim 7, wherein at a third time a reducing driver intervention (40) is detected, and wherein starting from the third time up to a fourth time the coupling (30) is reduced by increasing the relative movement of the input shaft with respect to the output shaft and/or the influence of the autonomous steering function on the wheel steering angle (24) is increased in such a way that at or after the fourth time the autonomous steering function has complete control over the steering system (2).

9. The method as claimed in claim 8, wherein in the case of an increased vehicle speed, the time period between the first time and the second time and/or the time period between the third time and the fourth time is longer than in the case of a reduced vehicle speed.

10. The method as claimed in claim 1, wherein coupling (30) is reduced by increasing a relative movement of the input shaft with respect to the output shaft as a function of a reducing driver intervention (40).

11. The method as claimed in claim 1, wherein a differentiation is made between an intended driver intervention (40) and an unintended driver intervention (40), wherein, in the case of an intended driver intervention (40) the coupling (30) is increased by reducing a relative movement of the input shaft with respect to the output shaft or maintained, and wherein in the case of an unintended driver intervention (40) the coupling (30) is reduced by increasing the relative movement of the input shaft with respect to the output shaft.

12. The method as claimed in claim 1, wherein an increase in the coupling (30) between the steering means angle (26) and the angle (28) which is introduced into the steering gear (14) reduces a relative movement of an input shaft (10) of the superimposition steering system (4) and of the output shaft (12) of the superimposition steering system (4), and wherein a reduction in the coupling (30) between the steering means angle (26) and the angle (12) which is introduced into the steering gear (14) increases a relative movement of the input shaft (10) of the superimposition steering system (4) and of the output shaft (12) of the superimposition steering system (4).

13. The method as claimed in claim 1, wherein the driver intervention (40) constitutes a steering angle which is applied to the steering means (8) by the driver of the vehicle and/or a torque which is applied to the steering means (8) by the driver of the vehicle, and wherein the driver intervention (40) is detected as a function of calculated and/or measured variables.

14. The method according to claim 1, wherein the detected driver intervention (40) is detected by a sensor (42) provided with the steering means (8).

15. A computer program for a digital computing device (20), which when executed by the computing device (20) causes the computing device to
 detect, during an autonomous driving mode of a motor vehicle, a driver intervention (40) of a driver of the motor vehicle into a steering means, operate a superimposition steering system (4) in such a way that a coupling (30) between a steering means angle (26) and an angle (28) which is introduced into the steering gear (14) is adjusted as a function of the detected driver intervention (40), and
 operate a power steering system (6) in the autonomous driving mode when a driver intervention (40) is not detected to adjust a wheel steering angle (24), while a steering means does not move.

16. A control device (18) for operating a steering system (2) of a motor vehicle, the steering system (2) including a superimposition steering system (4) that varies a coupling (30) between an input shaft (10) connected to a steering means (8) and an output shaft (12) connected to a steering gear (14), and a power steering system (6), wherein the control device (18) is provided with a digital computing device (20) configured to detect, during an autonomous driving mode of a motor vehicle, a driver intervention (40) of a driver of the motor vehicle into a steering means, and operate the superimposition steering system (4) in such a way that a coupling (30) between a steering means angle (26) of the steering means (8) and an angle (28) which is introduced into the steering gear (14) is adjusted as a function of the detected driver intervention (40).

17. The control device according to claim 16, wherein the digital computing device is configured to operate the power steering system (6) to adjust the steering angle in the autonomous driving mode without movement of the steering means (8).

\* \* \* \* \*